United States Patent
Sano et al.

(10) Patent No.: US 7,195,831 B2
(45) Date of Patent: Mar. 27, 2007

(54) FUEL CELL AND METHOD OF CONTROLLING THE SAME

(75) Inventors: Seiji Sano, Susono (JP); Shigeaki Murata, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 359 days.

(21) Appl. No.: 10/278,944

(22) Filed: Oct. 24, 2002

(65) Prior Publication Data

US 2003/0082433 A1 May 1, 2003

(30) Foreign Application Priority Data

Nov. 1, 2001 (JP) ............... 2001-336013

(51) Int. Cl.
*H01M 8/04* (2006.01)
(52) U.S. Cl. ............... 429/22; 429/34; 429/39; 429/13
(58) Field of Classification Search ............ 429/12–52
See application file for complete search history.

(56) References Cited

U.S. PATENT DOCUMENTS 5,288,562 A * 2/1994 Taniguchi et al. ............ 429/32
5,554,454 A * 9/1996 Gardner et al. ............... 429/19
6,277,511 B1   8/2001 Iwase et al.
6,521,369 B1 * 2/2003 Mercuri et al. ............... 429/40
6,589,678 B1 * 7/2003 McElroy ....................... 429/13
6,680,136 B2 * 1/2004 Mieney et al. ................ 429/13

FOREIGN PATENT DOCUMENTS

| JP | 7-235324 | 9/1995 |
|---|---|---|
| JP | 20000-30730 | 1/2000 |
| WO | WO 99/028985 A | 6/1999 |

OTHER PUBLICATIONS

German Office Action issued Sep. 29, 2006 in app. No. 102 50 572.1-45; copy of English translation of German Office Action.

* cited by examiner

*Primary Examiner*—Susy Tsang-Foster
*Assistant Examiner*—Keith Walker
(74) *Attorney, Agent, or Firm*—Kenyon & Kenyon LLP

(57) ABSTRACT

A fuel cell wherein reactive gas or coolant flow directions within single-cell internal passages may be changed by switching the positions of flow control means such as electromagnetic valves in order to alter flow directions and flow velocities in accordance with fuel cell operating states. Altering flow to different directions within the internal passages, such as to a second flow direction perpendicular to a first flow direction, permits control of gas flow to combat fuel cell flooding, wherein the altered reactant gas flow causes accumulated water to be discharged from the cell. Such flow control further permits control of gas and coolant temperatures to optimize cell moisture distribution and control.

23 Claims, 14 Drawing Sheets

FUEL CELL AND METHOD OF CONTROLLING THE SAME

INCORPORATION BY REFERENCE

The disclosure of Japanese Patent Application No. 2001-336013 filed on Nov. 1, 2001, including the specification, drawings, and abstract is incorporated herein by reference in its entirety.

BACKGROUND OF THE INVENTION

1. Field of the Invention

The invention relates to a fuel cell and a method of controlling the same.

2. Description of the Related Art

A fuel cell constructed by laminating a plurality of single cells each having a membrane electrode assembly (hereinafter referred to as the MEA) interposed between two separators has been known. The MEA is composed of an electrolytic membrane and gas diffusion electrodes. Platinum as catalytic electrodes is applied to both surfaces of the electrolytic membrane, which is interposed between the gas diffusion electrodes. The catalytic electrode and the gas diffusion electrode formed on one surface of the MEA constitutes an anode, and the catalytic electrode and the gas diffusion electrode formed on the other surface of the MEA constitute a cathode. A fuel gas passage in which hydrogen gas as fuel gas to flows through a single cell of the fuel cell is formed in a separator facing the anode. An oxidative gas passage in which air as oxidative gas to flows through the single cell is formed in a separator facing the cathode.

This electrolytic membrane usually functions as a good proton-conductive electrolyte in a wet state and thus is held wet by supplying fuel gas and oxidative gas that have been humidified in advance. However, for various reasons, flooding (a state of being too wet) may be caused. For example, if flooding occurs, water is produced in the gas passage and constitutes a flow resistance against gas, which may make it impossible to supply the gas diffusion electrodes with a sufficient amount of gas. In consideration of this drawback, Japanese Laid-Open Patent Application No. 7-2353234 or the like discloses a fuel cell wherein a dynamic pressure of gas is temporarily increased in response to the occurrence of flooding and wherein produced water in a gas passage is blown off and removed by the dynamic pressure.

However, the fuel cell of the aforementioned publication is designed to cause gas to constantly flow in a certain direction. Hence, if there is some factor (e.g., an obstacle) preventing produced water from moving in the direction, the produced water cannot be easily removed even in the case of an increase in the dynamic pressure of reactive gas.

SUMMARY OF THE INVENTION

It is an object of the invention to provide a fuel cell capable of efficiently removing an unwanted substance such as produced water in a gas passage. It is another object of the invention to provide a method of controlling such a fuel cell.

A first aspect of the invention relates to a fuel cell. This fuel cell comprises a single-cell internal gas passage in which reactive gas flows through a single cell of the fuel cell, a switching device that switches a flow direction of gas in the single-cell internal gas passage from a first direction to a second direction intersecting with the first direction, and a controller that switches the flow direction of gas in the single-cell internal gas passage from the first direction to the second direction in accordance with an operational state of the fuel cell by means of the switching device.

In this fuel cell, the flow direction of gas in the single-cell internal gas passage is switched from the first direction to the second direction intersecting with the first direction in accordance with an operational state of the fuel cell. Hence, even if there is some factor preventing an unwanted substance (e.g., produced water) existing in the single-cell internal gas passage in a certain operational state from moving in the first direction, the flow direction of gas is switched to the second direction intersecting with the first direction, whereby the factor is made less influential. As a result, the unwanted substance can be removed by gas. Accordingly, the unwanted substance in the gas passage can be efficiently removed.

It is to be noted herein that "reactive gas" means a gas used for an electrochemical reaction in a fuel cell and that "the operational state of the fuel cell" is not specifically limited and may be a parameter regarding operational control such as an output voltage or an impedance of the fuel cell, may be a humidity, a temperature, or an amount of supply of reactive gas used in the fuel cell, or may be a temperature or an amount of supply of coolant for the fuel cell.

A second aspect of the invention relates to a method of controlling a fuel cell capable of changing a flow direction of gas in a single-cell internal gas passage in which reactive gas flows through a single cell of the fuel cell. This method is designed to switch a flow direction of gas in the single-cell internal gas passage to a second direction intersecting with a first direction in accordance with an operational state of the fuel cell. In this control method, the flow direction of gas in the single-cell internal gas passage is switched from the first direction to the second direction intersecting with the first direction in accordance with an operational state of the fuel cell. Hence, even if there is some factor preventing an unwanted substance (e.g., produced water) existing in the single-cell internal gas passage in a certain operational state from moving in the first direction, the flow direction of gas is switched to the second direction intersecting with the first direction, whereby the factor is made less influential. As a result, the unwanted substance can be removed by gas. Accordingly, the unwanted substance in the gas passage can be efficiently removed.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

In order to further clarify the invention, preferred embodiments of the invention will be described hereinafter with reference to the drawings.

[First Embodiment]

Figure 1:
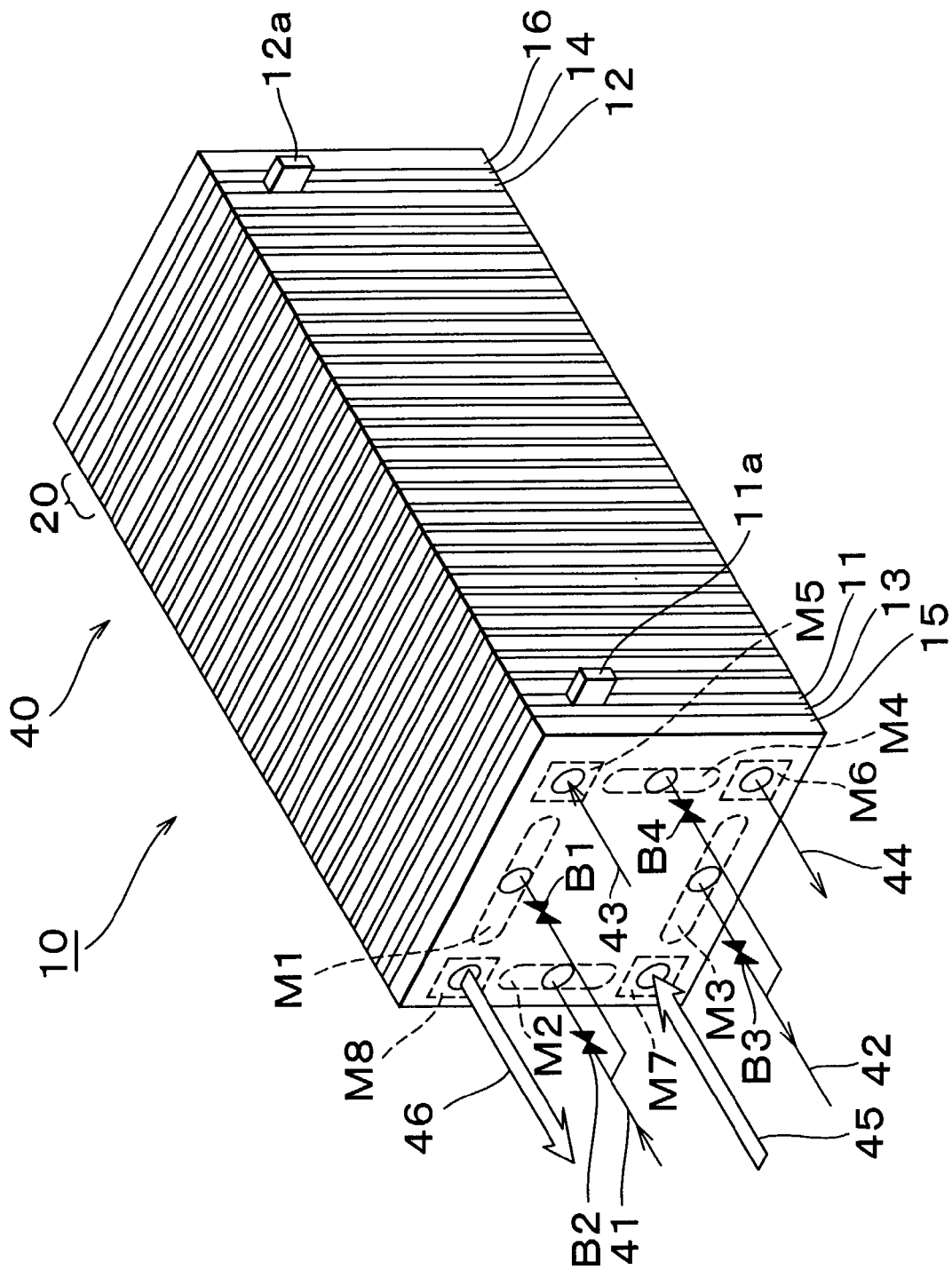
FIG. 1 is a perspective view of the overall construction of a fuel cell in accordance with a first embodiment of the invention.
Figure 5:
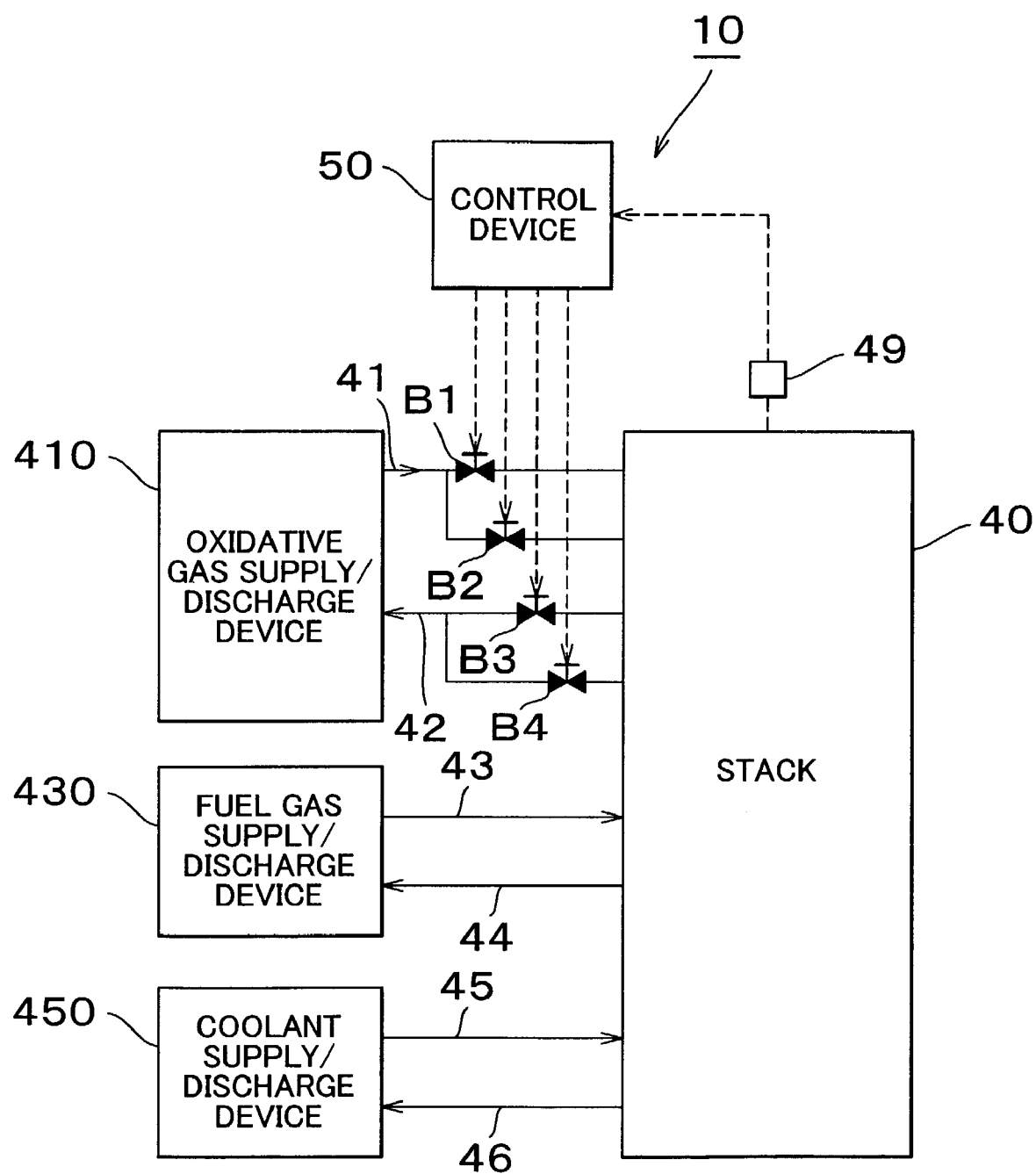
FIG. 5 is a schematic block diagram showing how components of the fuel cell are electrically connected.

A fuel cell 10 in accordance with the present embodiment shown in FIG. 1 is a polymer electrolyte fuel cell and mainly comprises a stack 40, an oxidative gas supply pipe 41, an oxidative gas discharge pipe 42, an oxidative gas supply/discharge device 410 (see FIG. 5), a fuel gas supply pipe 43, a fuel gas discharge pipe 44, a fuel gas supply/discharge device 430 (see FIG. 5), a coolant introduction pipe 45, a coolant exhaust pipe 46, a coolant supply/discharge device 450 (see FIG. 5), and a control device 50 (see FIG. 5). The stack 40 is composed of a plurality of laminated cell modules 20. The oxidative gas supply pipe 41, the oxidative gas discharge pipe 42, and the oxidative gas supply/discharge device 410 are designed to supply oxidative gas to and discharge oxidative gas from the stack 40. The fuel gas supply pipe 43, the fuel gas discharge pipe 44, and the fuel gas supply/discharge device 430 are designed to supply fuel gas to and discharge fuel gas from the stack 40. The coolant introduction pipe 45, the coolant exhaust pipe 46, and the coolant supply/discharge device 450 are designed to supply coolant to and discharge coolant from the stack 40. The control device 50 is designed to perform switching control for switching the flow direction of oxidative gas or the like.

Figure 2:
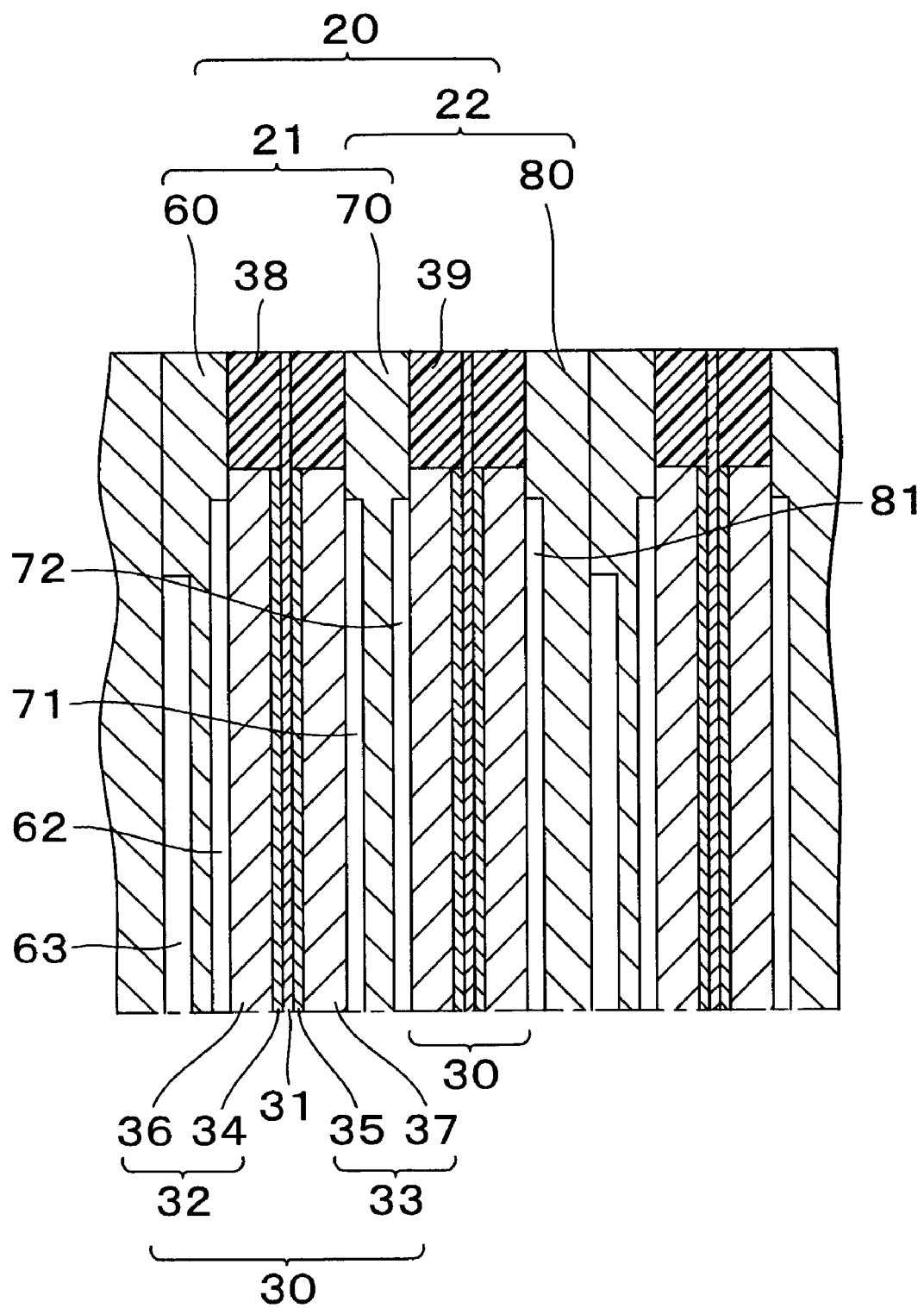
FIG. 2 is a partial cross-sectional view of a stack of the fuel cell.

As shown in FIG. 2, each of the cell modules 20 is constructed by laminating a cooling separator 60, an MEA 30, a central separator 70, an MEA 30, and an end separator 80 in this order. The cooling separator 60, the MEA 30, and the central separator 70 constitute a single cell 21. The central separator 70, the MEA 30, and the end separator 80 constitute a single cell 22. That is, the single cell 21 and the single cell 22 have the central separator 70 as a common member.

The MEA 30 is a anode-electrolyte-cathode assembly having an electrolytic membrane 31 interposed between an anode 32 and a cathode 33. It is to be noted herein that the electrolytic membrane 31 is a proton-conductive ion-exchange membrane (e.g., a Nafion® membrane manufactured by DuPont®) made of a polymer electrolyte material such as fluororesin and exhibits high electric conductivity in a wet state. Platinum or an alloy composed of platinum and another metal is applied to both surfaces of the electrolytic membrane 31, whereby catalytic electrodes 34, 35 are formed. Gas diffusion electrodes 36, 37, which are formed of carbon cloth woven from carbon fiber threads, are disposed outside the catalytic electrodes 34, 35 respectively. The catalytic electrode 34 and the gas diffusion electrode 36 constitute the anode 32. The catalytic electrode 35 and the gas diffusion electrode 37 constitute the cathode 33. It is not absolutely required that the gas diffusion electrodes 36, 37 be formed of carbon cloth. The gas diffusion electrodes 36, 37 may also be formed of carbon paper or carbon felt made of carbon fiber and are only required to exhibit sufficient gas diffusibility and sufficient conductivity.

Each of the separators 60, 70, 80 is formed of a conductive member impervious to gas, for example, is formed so as to be impervious to gas by compressing carbon. A second single-cell internal gas passage 62 through which fuel gas flows is formed on one surface of the cooling separator 60 which faces the anode 32 of the MEA 30 of the single cell 21. A coolant passage 63 through which coolant flows is formed on the other face of the cooling separator 60. A first single-cell internal gas passage 71 through which oxidative gas flows is formed on one surface of the central separator 70 which faces the cathode 33 of the MEA 30 of the single cell 21. A second single-cell internal gas passage 72 through which fuel gas flows is formed on the other surface of the central separator 70 which faces the anode 32 of the MEA 32 of the single cell 22. A first single-cell internal gas passage 81 is formed on one surface of the end separator 80 which faces the cathode 33 of the MEA 30 of the single cell 22.

A sealing member 38 is disposed in a gap between the cooling separator 60 and the central separator 70. A sealing member 39 is disposed in a gap between the central separator 70 and the end separator 80. The sealing members 38, 39 play roles of preventing fuel gas and oxidative gas from being mixed in those portions and preventing the gases from leaking out to the outside.

Figure 3:
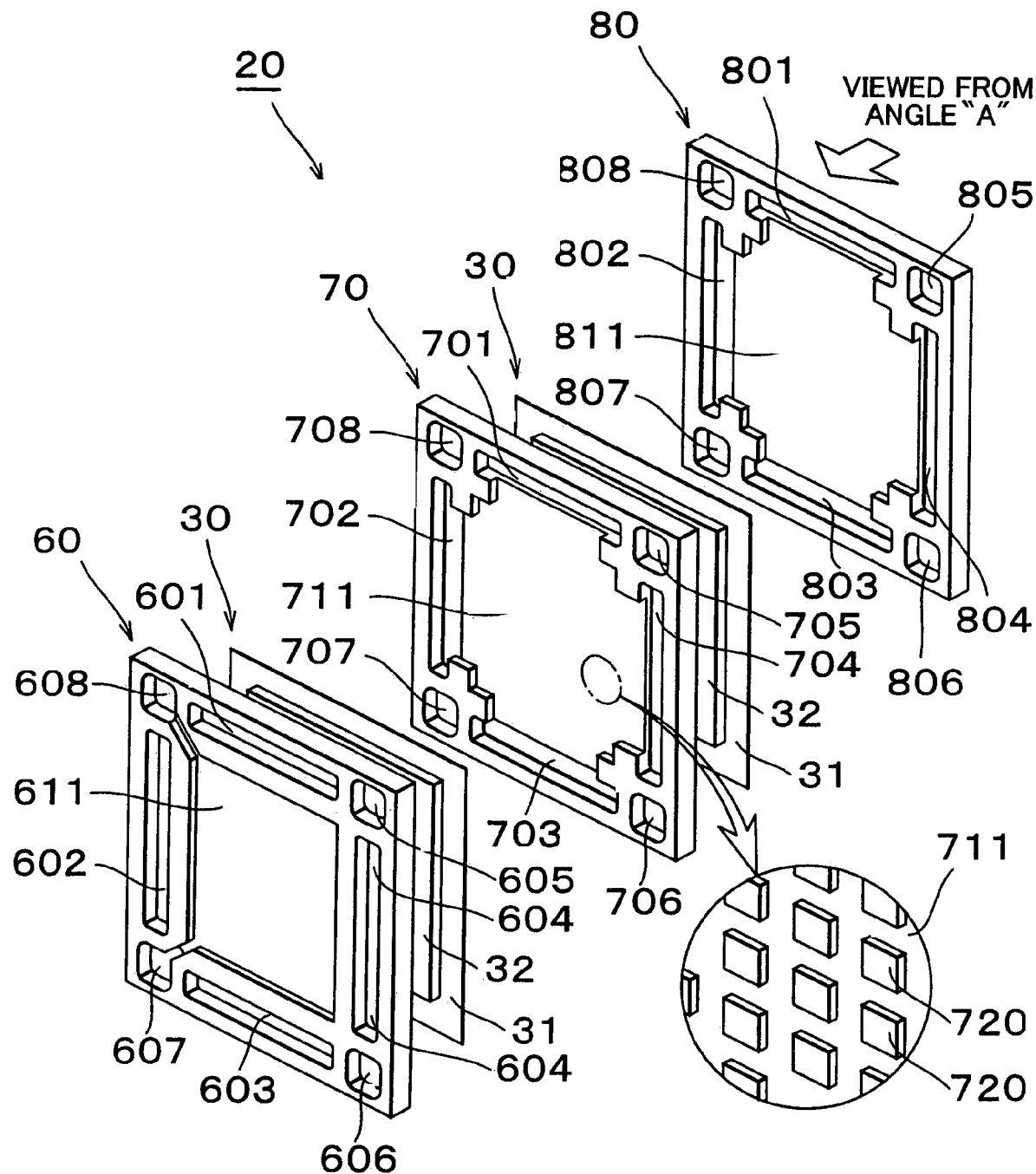
FIG. 3 is an exploded perspective view of a cell module.
Figure 4:
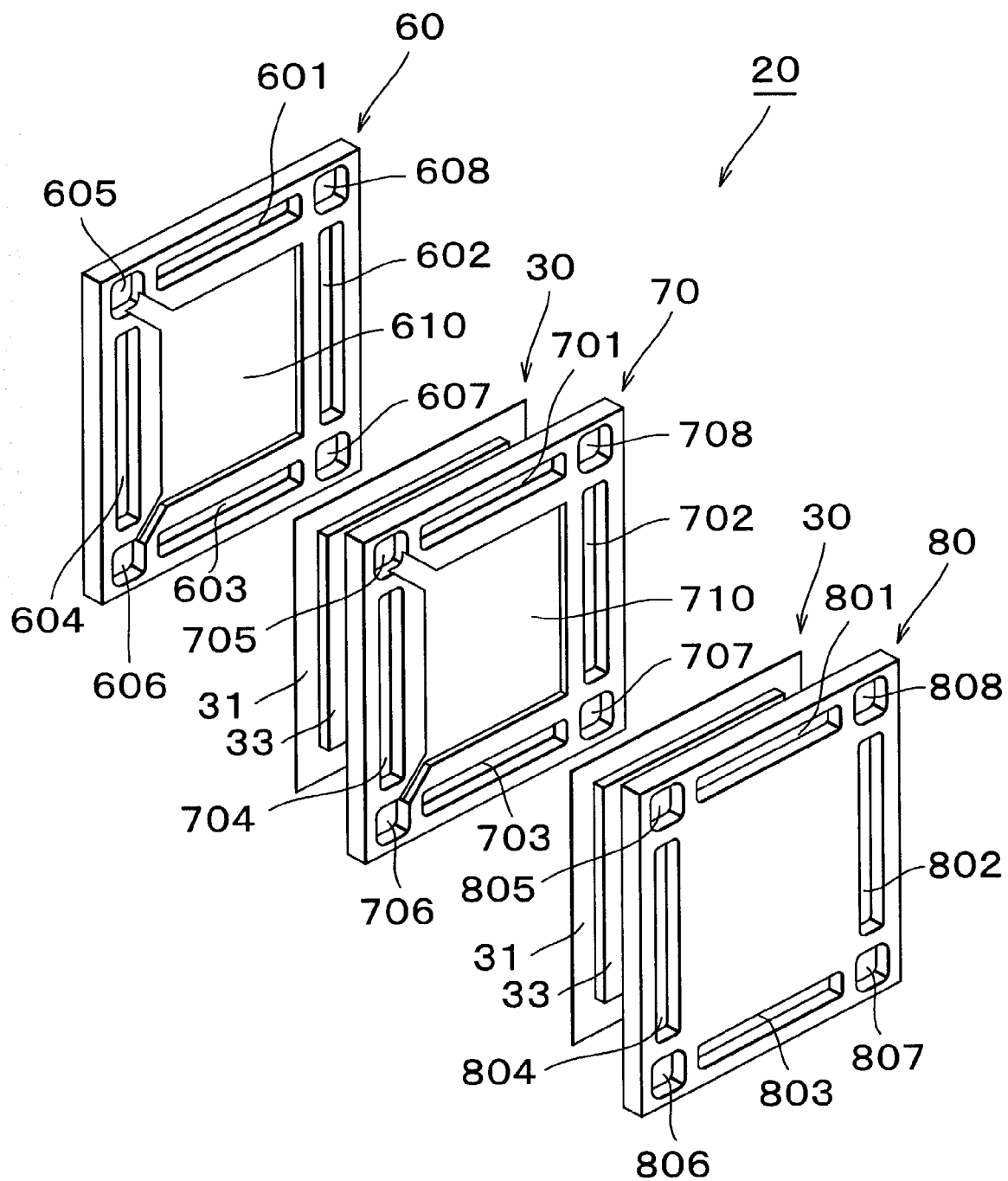
FIG. 4 is an exploded perspective view of the cell module which is viewed from an angle indicated by "A" (a blank arrow) in FIG. 3.

As shown in FIGS. 3 and 4, each of long holes 601 to 604 is formed through the cooling separator 60 in such a manner as to extend along a corresponding one of four sides thereof, and each of square holes 605 to 608 is formed through the cooling separator 60 at a corresponding one of four angles thereof. As shown in FIG. 4, a concave portion 610 having a generally rectangular outer periphery is formed in one surface of the cooling separator 60 which faces the anode 32 of the MEA 30 of the single cell 21. The concave portion 610 communicates with the square holes 605, 606. Fuel gas is supplied from the square hole 605, flows through the concave portion 610 of the single cell 21, that is, through the second single-cell internal gas passage 62, and is discharged from the square hole 606. As shown in FIG. 3, a concave portion 611 having a generally rectangular outer periphery is formed on the other surface of the cooling separator 60 as well. The concave portion 611 communicates with the square holes 607, 608. Coolant is supplied from the square hole 607, flows through the concave portion 611, that is, through the coolant passage 63, and is discharged from the square hole 608.

Each of long holes 701 to 704 is formed through the central separator 70 in such a manner as to extend along a corresponding one of four sides thereof, and each of square holes 705 to 708 is formed through the central separator 70 at a corresponding one of four corners thereof. A concave portion 711 having a generally rectangular outer periphery is formed in one surface of the central separator 70 which faces the cathode 33 of the MEA 30 of the single cell 21. The concave portion 711 communicates with the long holes 701 to 704. Oxidative gas is supplied from the long hole 701 to the single cell 21, flows through the concave portion 711, that is, through the first single-cell internal gas passage 71, and is discharged from the long hole 703. Alternatively, oxidative gas is supplied from the long hole 702 to the single cell 21, flows through the concave portion 711, that is, through the first single-cell internal gas passage 71, and is discharged from the long hole 704. As shown in FIG. 4, a concave portion 710 having a generally rectangular outer periphery is formed also on the other surface of the central separator 70 which faces the anode 32 of the MEA 30 of the single cell 22. The concave portion 710 communicates with the square holes 705, 706. Fuel gas is supplied from the square hole 705 to the single cell 22, flows through the concave portion 710, that is, through the second single-cell internal gas passage 72, and is discharged from the square hole 706.

Each of long holes 801 to 804 is formed through the end separator 80 in such a manner as to extend along a corresponding one of four sides thereof, and each of square holes 805 to 808 is formed through the end separator 80 at a corresponding one of four corners thereof. A concave portion 811 having a generally rectangular outer periphery is formed in one surface of the end separator 80 which faces the cathode 33 of the MEA 30 of the single cell 22. The concave portion 811 communicates with the long holes 801 to 804. Oxidative gas is supplied from the long hole 801 to the single cell 22, flows through the concave portion 811, that is, through the first single-cell internal gas passage 81, and is discharged from the long hole 803. Alternatively, oxidative gas is supplied from the long hole 802 to the single cell 22, flows through the concave portion 811, that is, through the first single-cell internal gas passage 81, and is discharged from the long hole 804. The other surface of the end separator 80 is formed as a flat surface.

Each of the concave portions 610, 611, 710, 711, 811 has a plurality of small protrusions. For example, small protrusions 720 generally in the shape of a cube or a rectangular parallelepiped as shown in a circle in FIG. 3 are formed in the concave portion 711 of the central separator 70 like a grid. The small protrusions 720 are formed such that their leading edge portions are in contact with the cathode 33 of the MEA 30 of the single cell 21. Areas in which the leading edge portions are in contact with the cathode 33 ensure conductivity. Oxidative gas flowing through the concave portion 711, that is, through the first single-cell internal gas passage 71 collides with lateral surfaces of the small protrusions 720 and is thereby diffused in the first single-cell internal gas passage 71. Furthermore, since the small protrusions 720 are disposed like a grid, oxidative gas can also flow in a direction from the long hole 701 to the long hole 703 or in a direction substantially perpendicular thereto, that is, in a direction from the long hole 702 to the long hole 704.

The stack 40 is composed of a plurality of the laminated cell modules 20 and is completed by sequentially disposing a current collector plate 11, an insulating plate 13, and an end plate 15 on one end of the cell module 20 and a current collector plate 12, an insulating plate 14, and an end plate 16 on the other end of the cell module 20. The current collector plates 11, 12 are formed of a conductive member impervious to gas, such as compact carbon, a copper plate, or the like. The insulating plates 13, 14 are formed of an insulative member such as rubber, resin, or the like. The end plates 15, 16 are formed of a metal such as rigid steel or the like. The current collector plates 11, 12 have output terminals 11a, 12a respectively, so that an electromotive force generated in the fuel cell 10 can be output. The end plates 15, 16 pressurize the stack 40 in the direction of lamination by means of a pressurizing device (not shown) and thus hold the stack 40.

In the stack 40, the long holes 601, 701, 801 are aligned in the direction of lamination, whereby a first oxidative gas supply manifold M1 is formed. The long holes 602, 702, 802 are aligned in the direction of lamination, whereby a second oxidative gas supply manifold M2 is formed. The long holes 603, 703, 803 are aligned in the direction of lamination, whereby a first oxidative gas discharge manifold M3 is formed. The long holes 604, 704, 804 are aligned in the direction of lamination, whereby a second oxidative gas discharge manifold M4 is formed. Oxidative gas that has been supplied to the first oxidative gas supply manifold M1 or the second oxidative gas supply manifold M2 flows through the first single-cell internal gas passages 71, 81 and then is collected in and discharged from the first oxidative gas discharge manifold M3 or the second oxidative gas discharge manifold M4. The square holes 605, 705, 805 are aligned in the direction of lamination, whereby a fuel gas supply manifold M5 is formed. The square holes 606, 706, 806 are aligned in the direction of lamination, whereby a fuel gas discharge manifold M6 is formed. Fuel gas that has been supplied to the fuel gas supply manifold M5 flows through the second single-cell internal gas passages 62, 72 and then is collected in and discharged from the fuel gas discharge manifold M6. Furthermore, the square holes 607, 707, 807 are aligned in the direction of lamination, whereby a coolant supply manifold M7 is formed. The square holes 608, 708, 808 are aligned in the direction of lamination, whereby a coolant discharge manifold M8 is formed. Coolant that has been supplied to the coolant supply manifold M7 flows through the coolant passage 63 and then is collected in and discharged from the coolant discharge manifold M8.

The oxidative gas supply pipe 41 branches off into two branch pipes from the oxidative gas supply/discharge device 410 for supply and discharging oxidative gas (compressed air in this case), and is connected to the first oxidative gas supply manifold M1 and the second oxidative gas supply manifold M2. A first electromagnetic valve B1 is installed in the branch pipe extending toward the first oxidative gas supply manifold M1. A second electromagnetic valve B2 is installed in the branch pipe extending toward the second oxidative gas supply manifold M2. On the other hand, branch pipes extending from the first oxidative gas discharge manifold M3 and the second oxidative gas discharge manifold M4 are assembled into the oxidative gas discharge pipe 42, which is connected to the oxidative gas supply/discharge device 410. A third electromagnetic valve B3 is installed in the branch pipe extending from the first oxidative gas discharge manifold M3. A fourth electromagnetic valve B4 is installed in the branch pipe extending from the second oxidative gas discharge manifold M4.

The fuel gas supply pipe 43 is connected to the fuel gas supply manifold M5 from the fuel gas supply/discharge device 430 for supplying and discharging fuel gas (hydrogen gas in this case). The fuel gas discharge pipe 44 is connected to the fuel gas supply/discharge device 430 from the fuel gas discharge manifold M6.

The coolant introduction pipe 45 is connected to the coolant supply manifold M7 from the coolant supply/discharge device 450 for supplying and discharging coolant (cooling water in this case). The coolant exhaust pipe 46 is connected to the coolant supply/discharge device 450 from the coolant exhaust manifold M8.

The control device 50 shown in FIG. 5 is constructed of a microcomputer having a known CPU, a known ROM, a known RAM, and the like. As shown in FIG. 5, the control device 50 is connected such that a detection signal from a voltmeter 49 for detecting an output voltage of the stack 40 is input to the control device 50, that control signals are output to the first electromagnetic valve B1 and the second electromagnetic valve B2 installed in the branch pipes of the oxidative gas supply pipe 41, and that control signals are output to the third electromagnetic valve B3 and the fourth electromagnetic valve B4 installed in the branch pipes of the oxidative gas discharge pipe 42.

Figure 6:
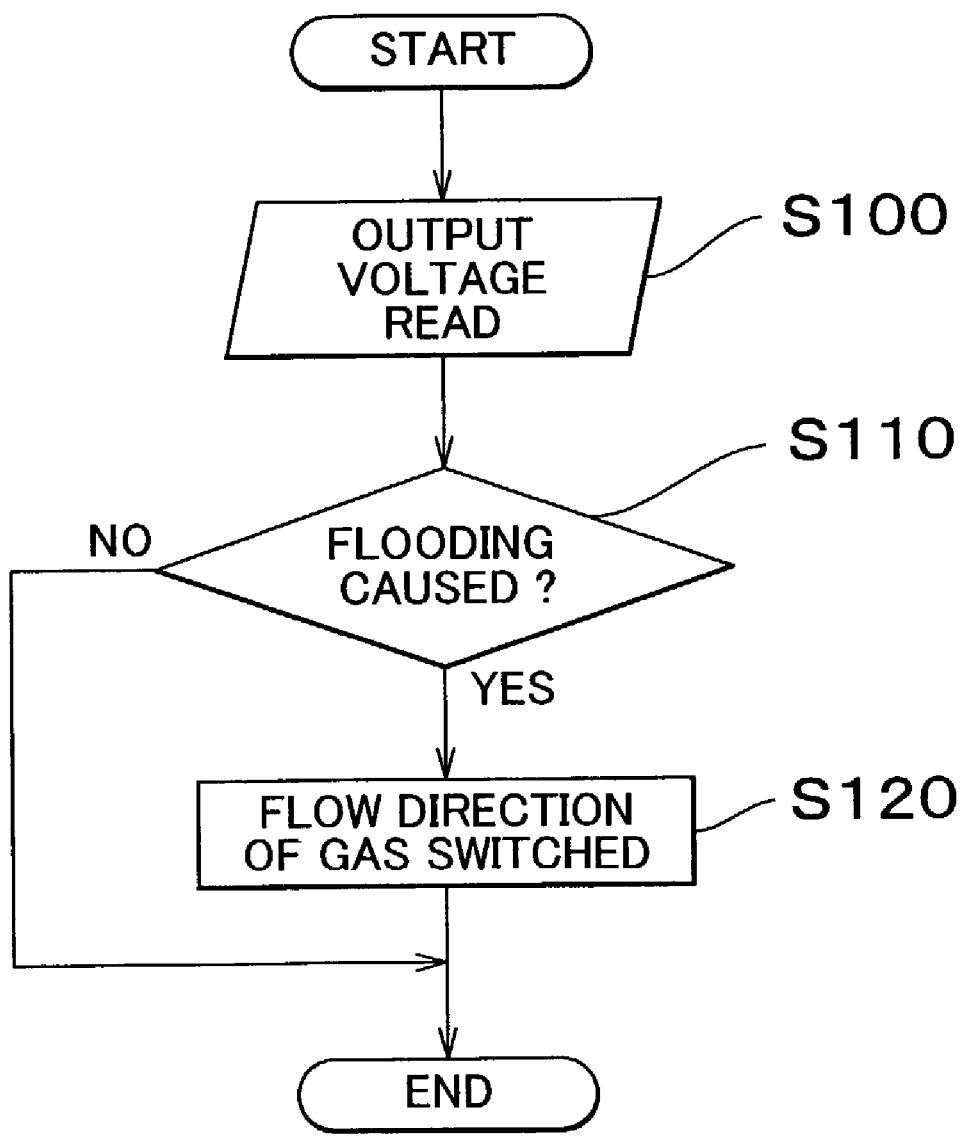
FIG. 6 is a flowchart of switching control for switching the flow direction of oxidative gas.

Next, switching control for switching the flow direction of oxidative gas will be described with reference to a flowchart shown in FIG. 6. This control is performed by the control device 50 of the present embodiment at intervals of a predetermined period (e.g., several milliseconds). If this switching control is started, the control device 50 first reads an output voltage detected by the voltmeter 49 (step S100), and determines on the basis of the output voltage whether or not flooding has occurred, that is, whether or not the first single-cell internal gas passages 71, 81 have become too wet (step S110). For example, in the case where flooding has occurred, it is known from experience that the fluctuation of the output voltage may exceed a predetermined fluctuation range. Hence, if the fluctuation of the output voltage has exceeded the predetermined fluctuation range, it is appropriate to estimate that flooding has occurred. In this case, it is appropriate that the fluctuation of the output voltage be a difference between a current output voltage and a last output voltage or that the fluctuation of the output voltage be a difference between a maximum value and a minimum value in a time width that precedes the current moment by a predetermined period. If flooding has not occurred, the present program is immediately terminated. If flooding has occurred, control signals are output to the electromagnetic valves B1 to B4 (step S120) so as to switch the flow direction of oxidative gas from a current direction to a direction that is substantially perpendicular thereto. Then, the present program is terminated.

Figure 7A:
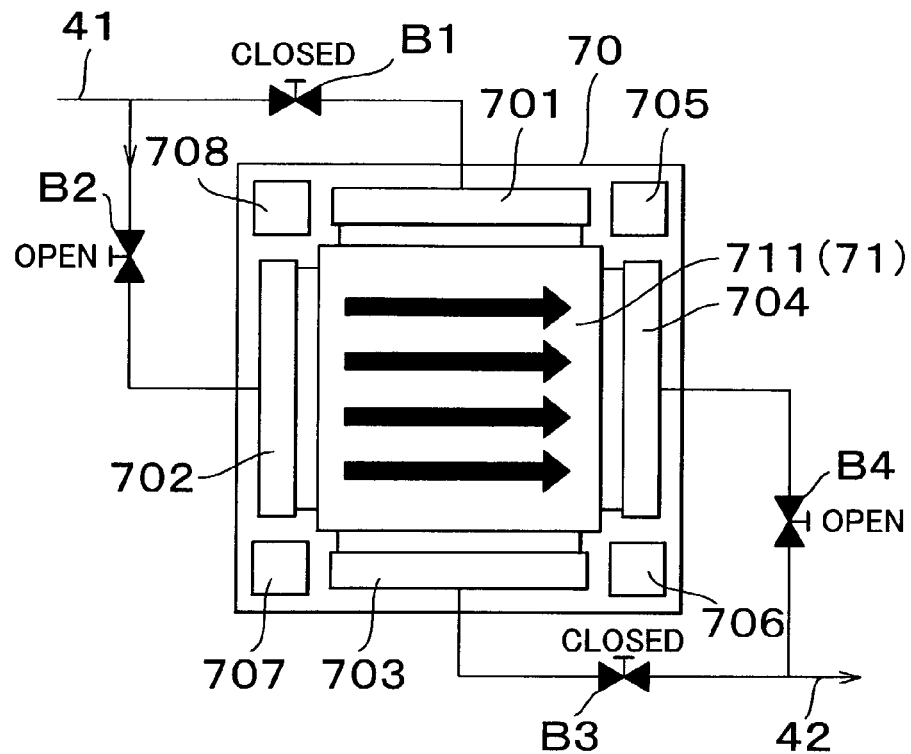
FIGS. 7A and 7B are plan views of a central separator which is viewed from the side of a first single-cell internal gas passage and is also an explanatory view showing two flow directions of oxidative gas.
Figure 7B:
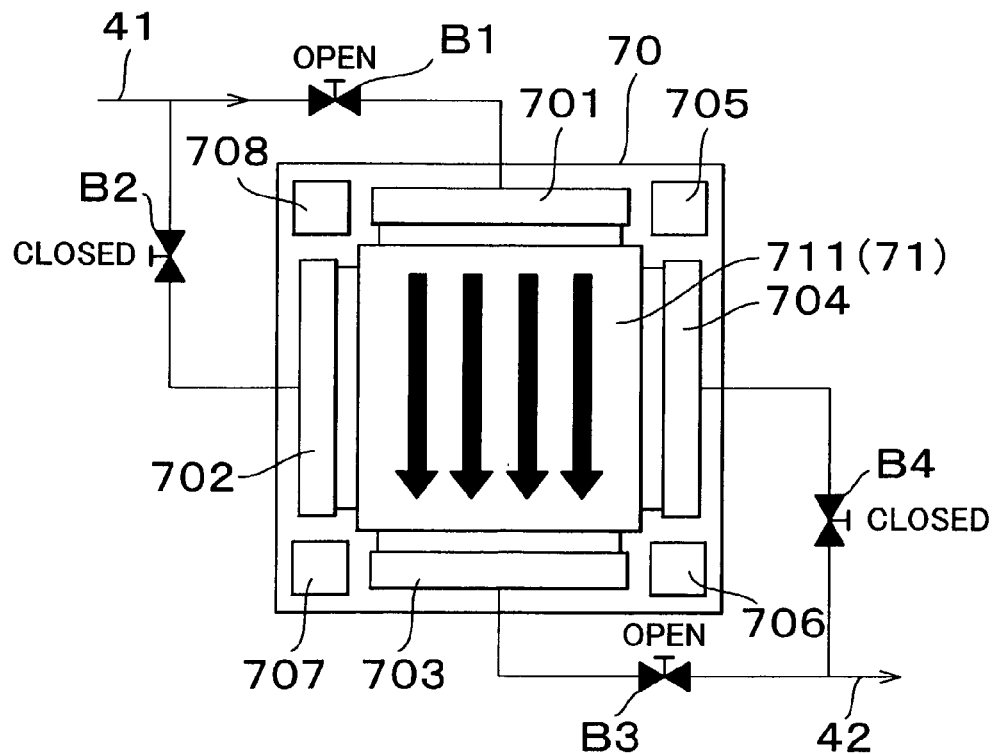

The switching of the flow direction of oxidative gas will be described with reference to FIGS. 7A and 7B. FIGS. 7A and 7B are plan views of the central separator 70 which is viewed from the side of the first single-cell internal gas passage 71. FIG. 7A shows a first gas flow direction. FIG. 7B shows a second gas flow direction. First of all, it is assumed that the first electromagnetic valve B1 and the third electromagnetic valve B3 have been closed and that the second electromagnetic valve B2 and the fourth electromagnetic valve B4 have been opened (see FIG. 7A). In this case, oxidative gas horizontally flows from the long hole 702 through the first single-cell internal gas passage 71 and is discharged from the long hole 704. If it is assumed herein that the flow direction of gas is switched in step S120, the control device 50 outputs control signals to the electromagnetic valves B1 to B4 so as to open the first electromagnetic valve B1 and the third electromagnetic valve B3 and close the second electromagnetic valve B2 and the fourth electromagnetic valve B4 (see FIG. 7B). Thereby oxidative gas vertically flows from the long hole 701 through the first single-cell internal gas passage 71 and is discharged from the long hole 703. That is, the flow direction of oxidative gas is switched from the horizontal direction to the vertical direction, which is substantially perpendicular to the horizontal direction.

Figure 8A:
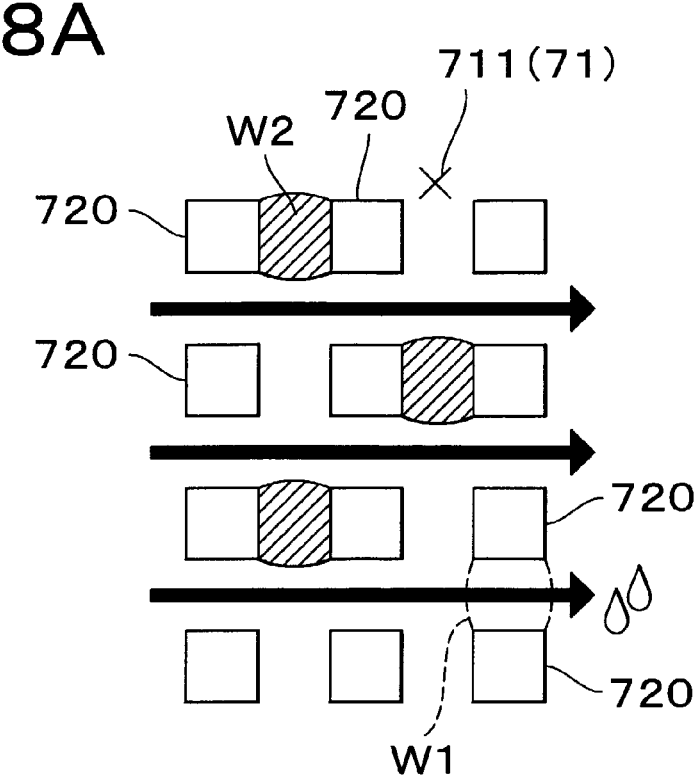
FIGS. 8A and 8B are partially enlarged views of the first single-cell internal gas passage of the central separator.
Figure 8B:
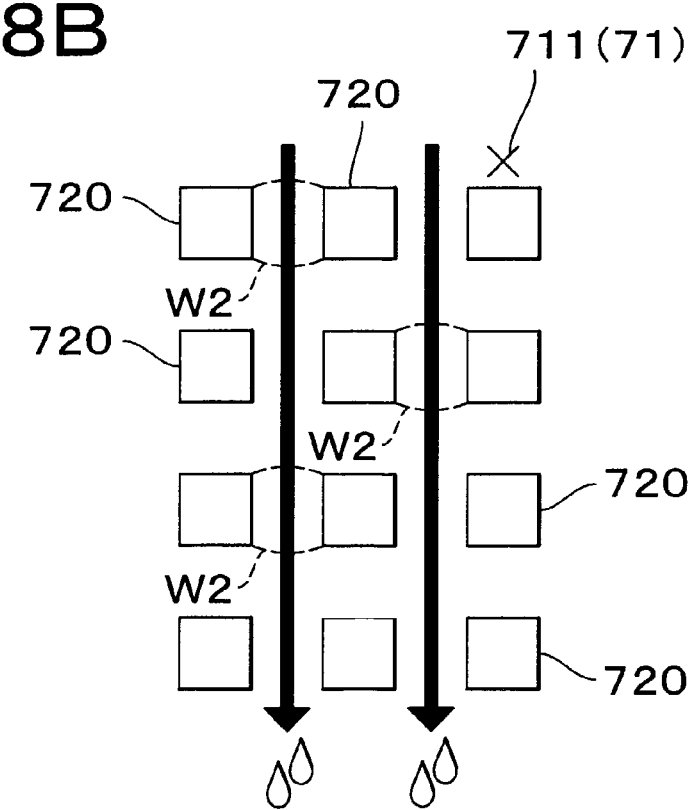

A state of the first single-cell internal gas passage 71 in the case of flooding will now be described with reference to FIGS. 8A and 8B. FIGS. 8A and 8B are partially enlarged views of the first single-cell internal gas passage 71 of the central separator 70. Because the small protrusions 720 rise from the surface of the first single-cell internal gas passage 71 like a grid, water produced in the passage 71 tends to accumulate among the small protrusions 720. For example, when oxidative gas horizontally flows, produced water W1 accumulating among the small protrusions 720 that are vertically disposed is removed along with the flow of oxidative gas as shown in FIG. 8A. However, produced water W2 accumulating among the small protrusions 720 that are horizontally disposed is prevented by the surrounding small protrusions 720 from moving along with the flow of oxidative gas and thus remains without being removed. This is a state in which flooding has occurred. If flooding as mentioned herein occurs, an increase in the fluctuation of the output voltage or the like is caused. In this case, the fluctuation of the output voltage may exceed a predetermined fluctuation range.

In the present embodiment, as has been described with reference to FIGS. 7A and 7B, if flooding has occurred, the flow direction of oxidative gas is switched to a direction that is substantially perpendicular thereto. Hence, as shown in FIG. 8B, the produced water W2 remaining without being removed in FIG. 8A is removed along with the switched flow of oxidative gas. Accordingly, flooding is eliminated. Even if the opening and closing of the electromagnetic valves B1 to B4 has been switched, it may take a while until flooding is eliminated. Thus, the control device 50 may start switching control next time in consideration of a period required for the elimination of flooding.

It will now be clarified how the components of the present embodiment correspond to the components of the invention. The first to fourth electromagnetic valves B1 to B4 of the present embodiment can be regarded as switching device of the invention. The control device 50 of the present embodiment can be regarded as a controller of the invention.

According to the fuel cell 10 of the present embodiment that has been described hitherto in detail, if flooding has occurred in the first single-cell internal gas passages 71, 81, the flow direction of oxidative gas in the first single-cell internal gas passages 71, 81 is suitably switched from a current flow direction to another flow direction that is substantially perpendicular thereto. Hence, even if the small protrusions 720 prevent the produced water W2 from moving in the current flow direction as shown in FIG. 8A, the flow direction of oxidative gas is switched to another flow direction extending substantially perpendicular to the current flow direction in FIG. 8B, whereby it becomes possible to easily remove the produced water W2 along with the switched flow of gas. Accordingly, the produced water in the first single-cell internal gas passages 71, 81 can be efficiently removed.

In the aforementioned embodiment, it is also appropriate that oxidative gas be normally caused to flow downwards as shown in FIG. 7B, namely, in a direction allowing produced water to be easily discharged by gravity, and that the flow direction of oxidative gas be temporarily switched to the horizontal direction as shown in FIG. 7A only in response to the occurrence of flooding. Thus, even if a large amount of water has been produced in the cathode 33 as in the case of a high output of the fuel cell, the produced water is normally discharged by gravity and flooding is eliminated by switching the flow direction of oxidative gas to the horizontal direction only in response to the occurrence of flooding. Therefore, the produced water can be efficiently removed.

In the aforementioned embodiment, it is determined whether or not flooding has occurred, depending on whether or not the fluctuation of the output voltage has exceeded the predetermined fluctuation range. However, it is also appropriate to determine whether or not flooding has occurred, on the basis of a result of a comparison between the output voltage of the stack 40 and a predetermined voltage set in advance or a result of a comparison between an impedance of the stack 40 and a predetermined impedance set in advance. It is also appropriate that this determination be made on the basis of a suitable combination of the results.

Figure 9:
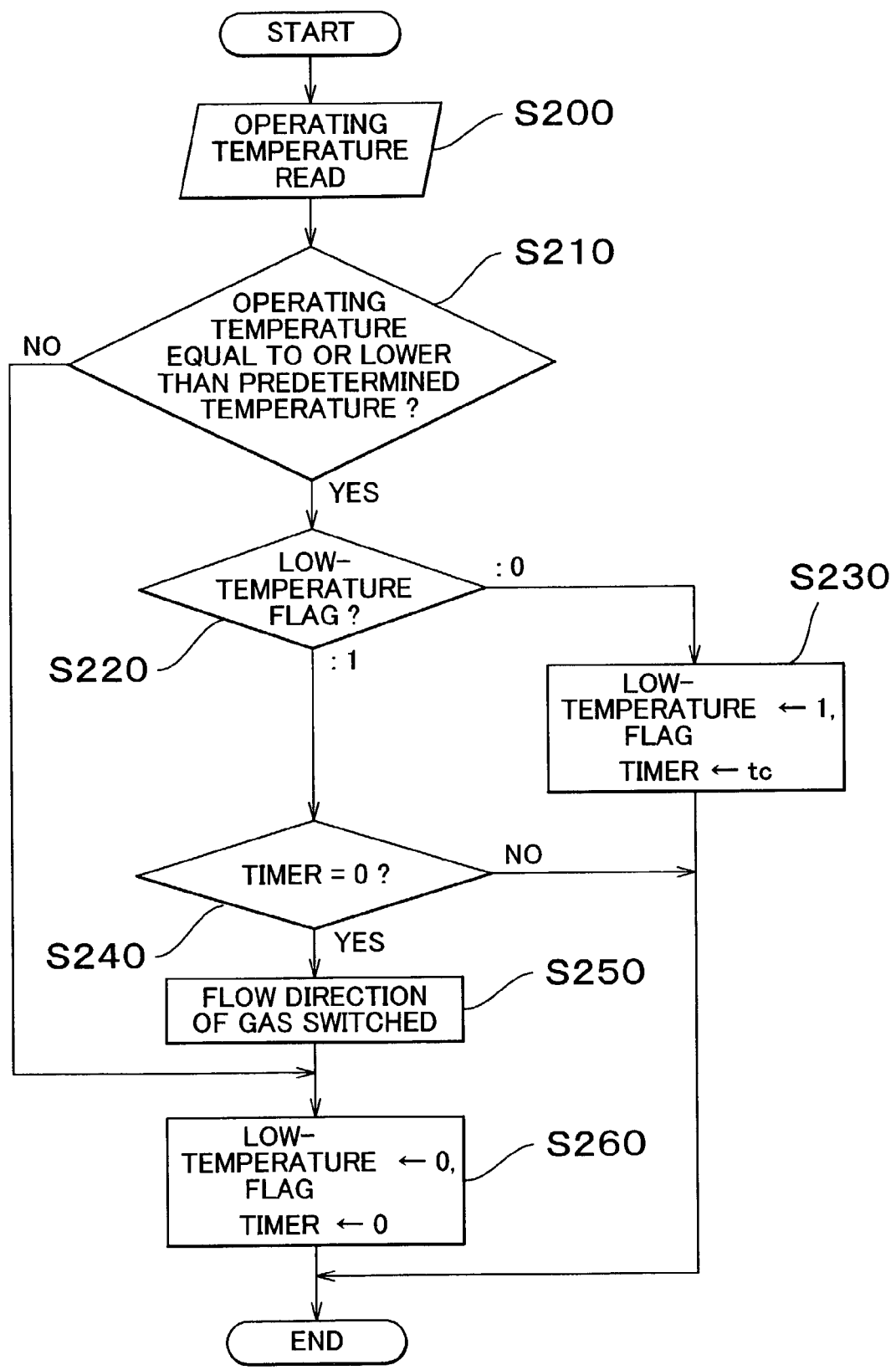
FIG. 9 is a flowchart of control for switching the flow direction of oxidative gas in accordance with a modification example of the first embodiment of the invention.

If the operating temperature of the fuel cell 10 is equal to or lower than a predetermined temperature, the amount of saturated aqueous vapor contained in reactive gas is small and thus condensate tends to be generated in the single-cell internal gas passages. Hence, even if condensate has been generated, it may be removed by switching the flow direction of gas regularly or irregularly. For example, the control device 50 may perform switching control shown in FIG. 9 at intervals of a predetermined period (e.g., several milliseconds). If this switching control is started, the control device 50 first reads an operating temperature (step S200) and determines whether or not the operating temperature is equal to or lower than a predetermined temperature (e.g., 60° C.) (step S210). If the operating temperature is equal to or lower than the predetermined temperature, the control device 50 determines whether or not a low-temperature flag has been set as "1" (step S220). If the low-temperature flag has been set as "0", it is set as "1" and a predetermined period tc is set for a timer so as to start a count-down operation (step S230). Then, the present program is terminated. It is to be noted herein that the low-temperature flag is designed to indicate that the operating temperature is equal to or lower than the predetermined temperature. That is, if the low-temperature flag has been set as "1", it indicates that the operating temperature is equal to or lower than the predetermined temperature. If the low-temperature flag has been set as "1" in step S220, the control device 50 determines whether or not the timer indicates zero (step S240). If the timer does not indicate zero, the present program is terminated. If the timer indicates zero, it is concluded that the operating temperature has remained equal to or lower than the predetermined temperature for the predetermined period tc, which implies a possibility of condensate being generated. Hence, the flow direction of gas is switched (step S250). After the flow direction of gas has been switched or if the operating temperature is not equal to or lower than the predetermined temperature, the low-temperature flag and the timer are reset (step S260). Then, the present program is terminated. As a result, the flow direction of gas is regularly switched every time the predetermined period tc elapses with the operating temperature being equal to or lower than the predetermined temperature. Thus, even if condensate has been generated, it can be removed. It is appropriate that the operating temperature be read for example from a temperature detection sensor installed at a predetermined position of the stack 40 or be obtained by detecting a temperature of coolant for cooling the fuel cell by means of a temperature detection sensor.

Furthermore, in the aforementioned embodiment, the flow direction of oxidative gas is switched. However, it is also appropriate to switch the flow direction of fuel gas instead of the flow direction of oxidative gas. For example, in the aforementioned embodiment, the construction of the supply/discharge paths for oxidative gas and the construction of the supply/discharge paths for fuel gas may be interchanged. In this case, produced water in the single-cell internal gas passages for fuel gas can be efficiently removed.

Figure 10A:
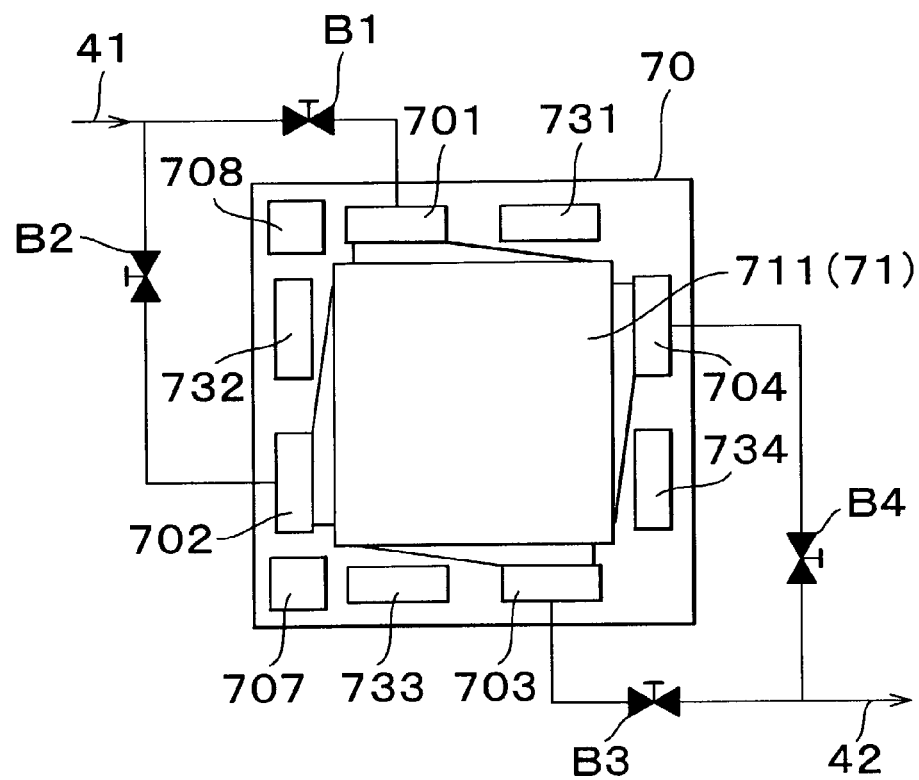
FIGS. 10A and 10B are explanatory views of the construction of the central separator when the flow directions of both oxidative gas and fuel gas are switched.
Figure 10B:
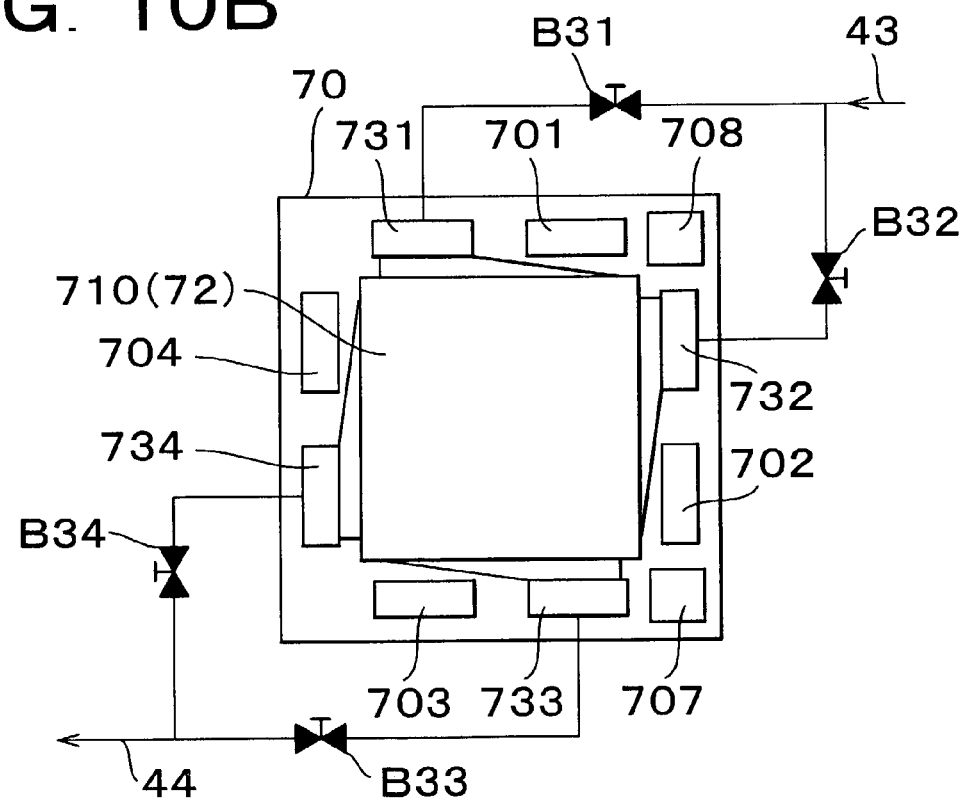

Alternatively, it is also appropriate that both the flow direction of oxidative gas and the flow direction of fuel gas be switched. In an exemplary case of the central separator 70, two long holes 701, 731, two long holes 702, 732, two long holes 703, 733, and two long holes 704, 734 are each formed in a corresponding one of sides of the central separator 70 as shown in FIGS. 10A and 10B, which show one surface and the other surface of the central separator 70 respectively. In this exemplary case, the flow direction of oxidative gas may be switched between the flow direction of gas from the long hole 701 through the concave portion 711 (the first single-cell internal gas passage 71) to the long hole 703 and the flow direction of gas from the long hole 702 through the concave portion 711 (the first single-cell internal gas passage 71) to the long hole 704 by controlling the electromagnetic valves B1 to B4 by means of the control device 50. In this exemplary case, the flow direction of fuel gas may be switched between the flow direction of gas from the long hole 731 through the concave portion 710 (the second single-cell internal gas passage 72) to the long hole 733 and the flow direction of gas from the long hole 732 through the concave portion 710 (the second single-cell internal gas passage 72) to the long hole 734 by controlling the electromagnetic valves B31 to B34 by means of the control device 50. In this case, produced water in the single-cell internal gas passages for both the gases can be efficiently removed. It is also appropriate herein that switching control be performed such that the flow directions of oxidative gas and fuel gas constantly establish a counterflow relationship (i.e., that oxidative gas and fuel gas flow in opposite directions). Thus, the distribution of water in the plane of the MEA 30 can be substantially homogenized.

[Second Embodiment]

The present embodiment is substantially identical to the first embodiment except that the first single-cell internal gas passages 71, 81 through which oxidative gas flows are differently constructed. An exemplary case of the first single-cell internal gas passage 71 will be described herein with reference to FIGS. 11A and 11B and the description will be omitted in other respects.

Figure 11A:
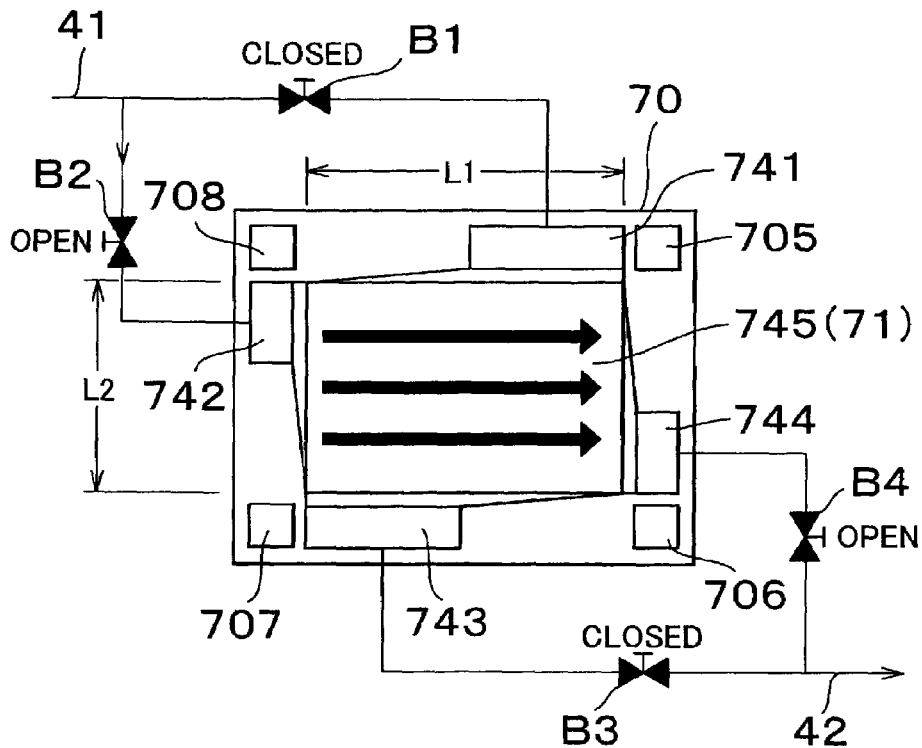
FIGS. 11A and 11B are explanatory views of the flow direction of oxidative gas in accordance with a second embodiment of the invention.
Figure 11B:
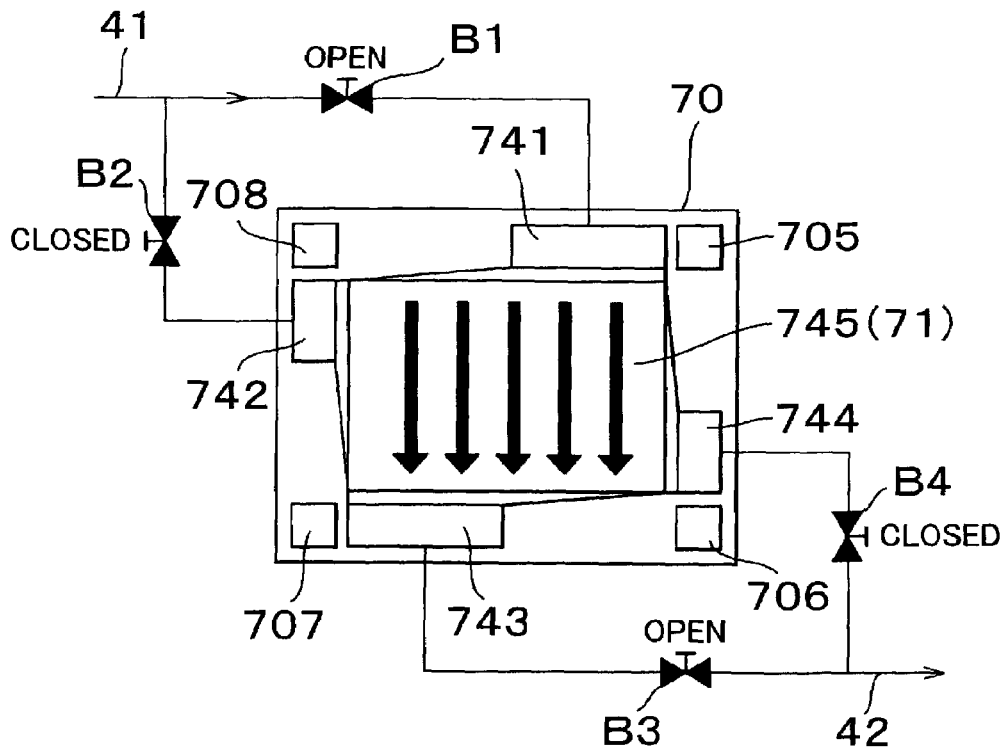

As shown in FIG. 11, each of long holes 741 to 744 is formed through the central separator 70 as a component of the cell module 20 along a corresponding one of four sides thereof. A concave portion 745 having a generally oblong outer periphery is formed in one surface of the central separator 70 which faces the cathode of the single cell. The concave portion 745 communicates with the long holes 741 to 744. Although not shown, small protrusions substantially identical to those of the first embodiment rise from the surface of the concave portion 745 like a grid. Oxidative gas is supplied to the single cell either by horizontally flowing from the long hole 742 through the concave portion 745, that is, through the first single-cell internal gas passage 71 and being discharged from the long hole 744 (see FIG. 11A) or by vertically flowing from the long hole 741 through the concave portion 745, that is, through the first single-cell internal gas passage 71 and being discharged from the long hole 743 (see FIG. 11B) If a comparison is made herein between the former flow direction of gas and the latter flow direction of gas, the first single-cell internal gas passage 71 is longer and narrower in the case of the former flow direction of gas than in the case of the latter flow direction of gas. This is because the concave portion 745 is formed with a horizontal length L1 that is longer than a vertical length L2. It is to be noted herein that the central separator 70 of the present embodiment has the square holes 705, 706 through which fuel gas flows and the square holes 707, 708 through which coolant flows as in the case of the first embodiment.

Figure 12:
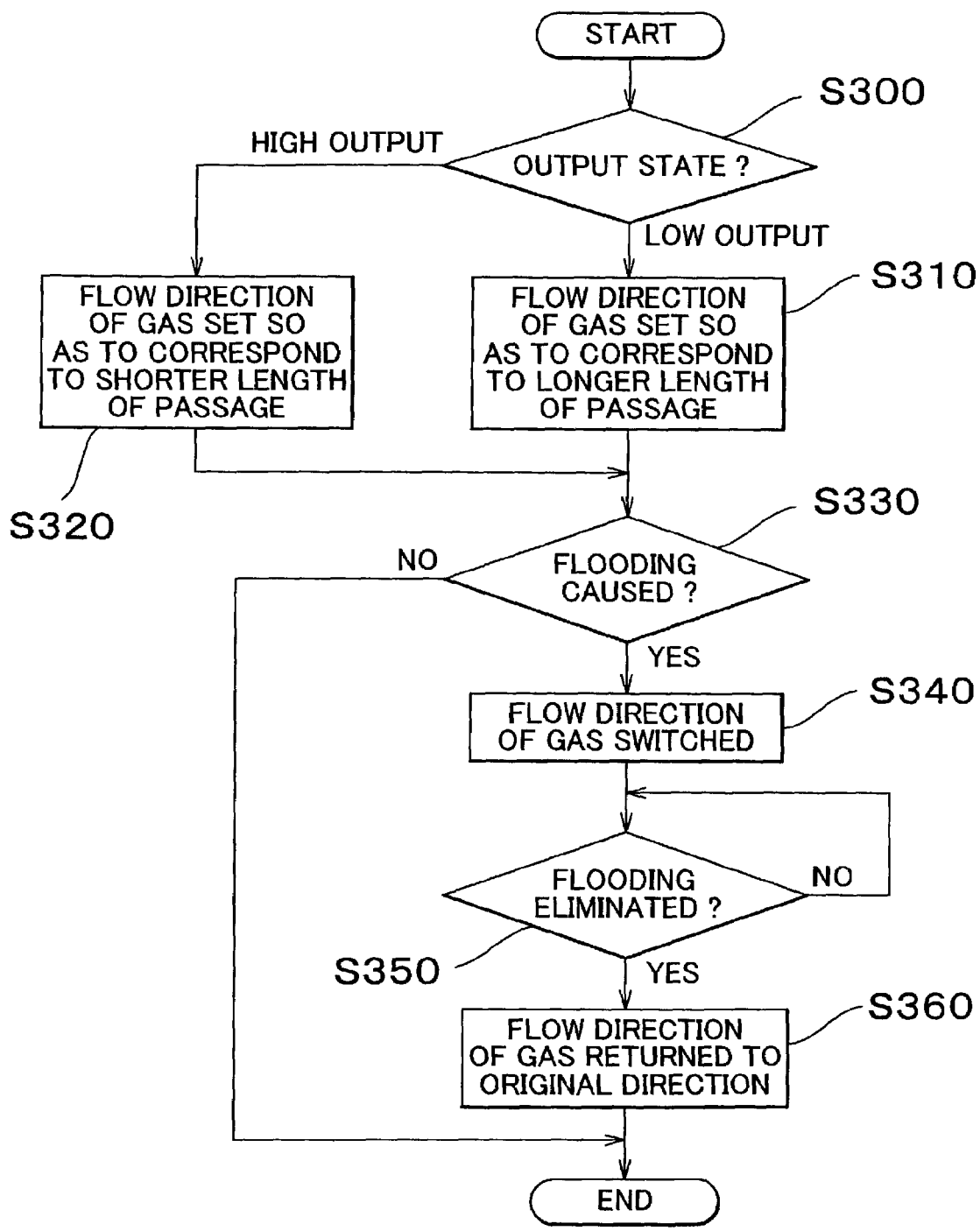
FIG. 12 is a flowchart of switching control for switching the flow direction of oxidative gas in accordance with the second embodiment.

Next, switching control for switching the flow direction of oxidative gas in accordance with the present embodiment will be described with reference to a flowchart shown in FIG. 12. This switching control is performed by the control device 50 at intervals of a predetermined period. If this switching control is started, the control device 50 first determines whether the current output of the fuel cell is a low output or a high output (step S300). In the case of a low output, the first electromagnetic valve B1 and the third electromagnetic valve B3 are closed and the second electromagnetic valve B2 and the fourth electromagnetic valve B4 are opened, whereby oxidative gas is caused to flow through the first single-cell internal gas passage 71 in the flow direction shown in FIG. 11A (i.e., in the horizontal direction) (step S310). On the other hand, in the case of a high output, the first electromagnetic valve B1 and the third electromagnetic valve B3 are opened and the second electromagnetic valve B2 and the fourth electromagnetic valve B4 are closed, whereby oxidative gas is caused to flow through the first single-cell internal gas passage 71 in the flow direction shown in FIG. 11B (i.e., in the vertical direction) (step S320). After one of the flow directions of gas has been determined in step S310 or step S320, the control device 50 determines substantially in the same manner as in the first embodiment whether or not flooding has occurred (step S330). If flooding has not occurred, the present program is immediately terminated. On the other hand, if flooding has occurred, the control device 50 switches the flow direction of oxidative gas to the other flow direction (step S340). The control device 50 then determines whether or not flooding has been eliminated (step S350). If flooding has not been eliminated, the control device 50 waits without performing any further processing. If flooding has been eliminated, the control device 50 returns the flow direction of oxidative gas to the original flow direction (step S360), whereby the present program is terminated.

According to the present embodiment that has been described hitherto, one of the flow directions of gas that corresponds to the longer and narrower passage is selected in the case of a low output. This brings about an increase in flow rate, gas diffusibility, and gas utilization ratio. Further, one of the flow directions of gas that corresponds to the shorter and wider passage is selected in the case of a high output. This brings about a decrease in gas pressure loss. Furthermore, if flooding has occurred, a current flow direction of gas is temporarily switched to another flow direction that is substantially perpendicular thereto. Hence, produced water in the first single-cell internal gas passage 71 is efficiently removed.

Figure 13:
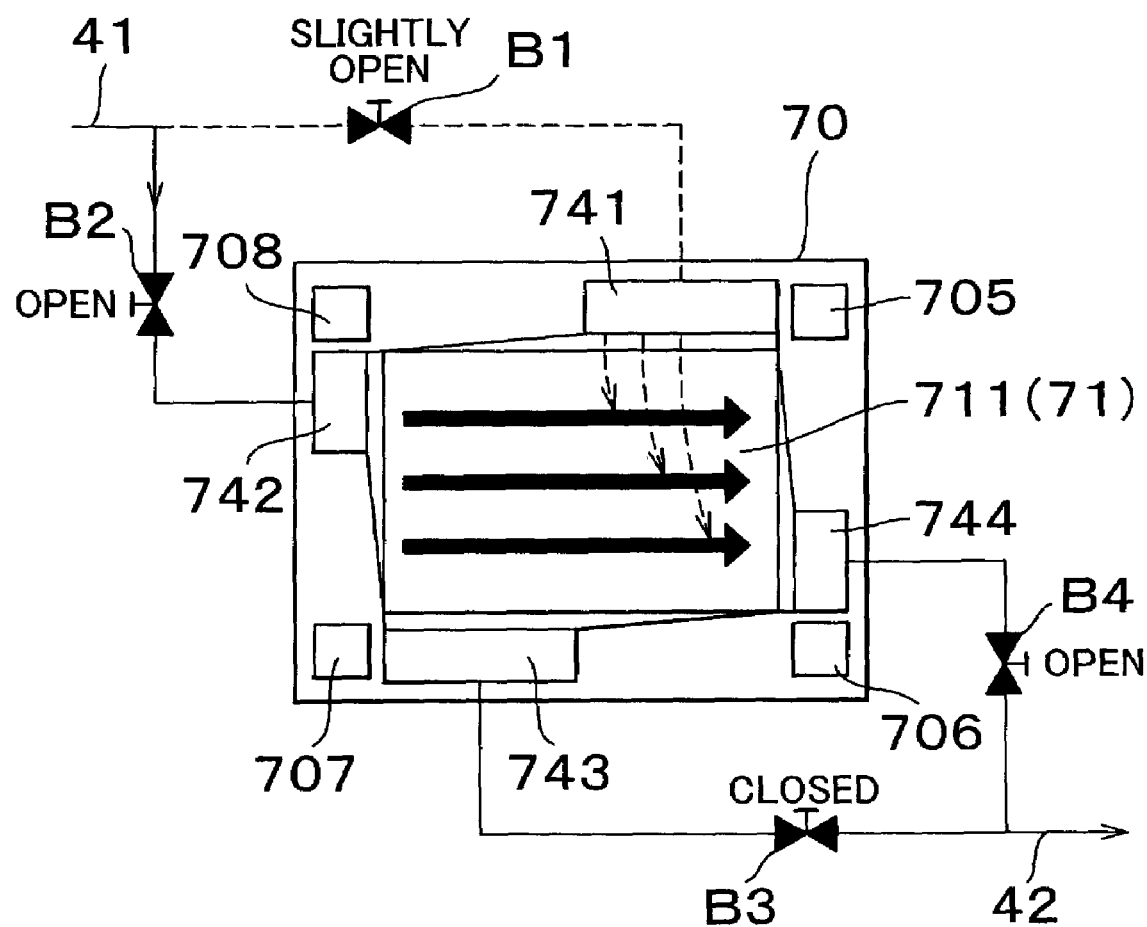
FIG. 13 is an explanatory view of a method of causing oxidative gas to flow in accordance with a modification example of the second embodiment.

As shown in FIG. 13, it is also appropriate in the case of a low output that the first electromagnetic valve B1 be slightly open instead of being closed. That is, it is also appropriate to perform supply/discharge control such that oxidative gas is supplied to the first single-cell internal gas passage 71 from both the long hole 742 serving as a gas supply port during the horizontal flow of gas and the long hole 741 serving as a gas supply port during the vertical flow of gas and that oxidative gas is discharged from the long hole 744 serving as a gas discharge port during the horizontal flow of gas. Thus, the flow rate of gas supplied to each of the gas supply ports can be reduced in comparison with a case where oxidative gas is supplied from a single gas supply port. As a result, the upstream side of the first single-cell internal gas passage 71 becomes unlikely to be dry. Further, oxidative gas that has been supplied from the long hole 741 merges on the downstream side of the first single-cell internal gas passage 71. Thus, the gas concentration can be prevented from being reduced on the downstream side. This supply/discharge control may also be adopted in a construction in which length and width of a passage of the first flow direction of gas are length and width of a passage of the second flow direction of the gas as in the case of the first embodiment. In this case as well, the same effect can be substantially achieved.

[Third Embodiment]

Figure 14A:
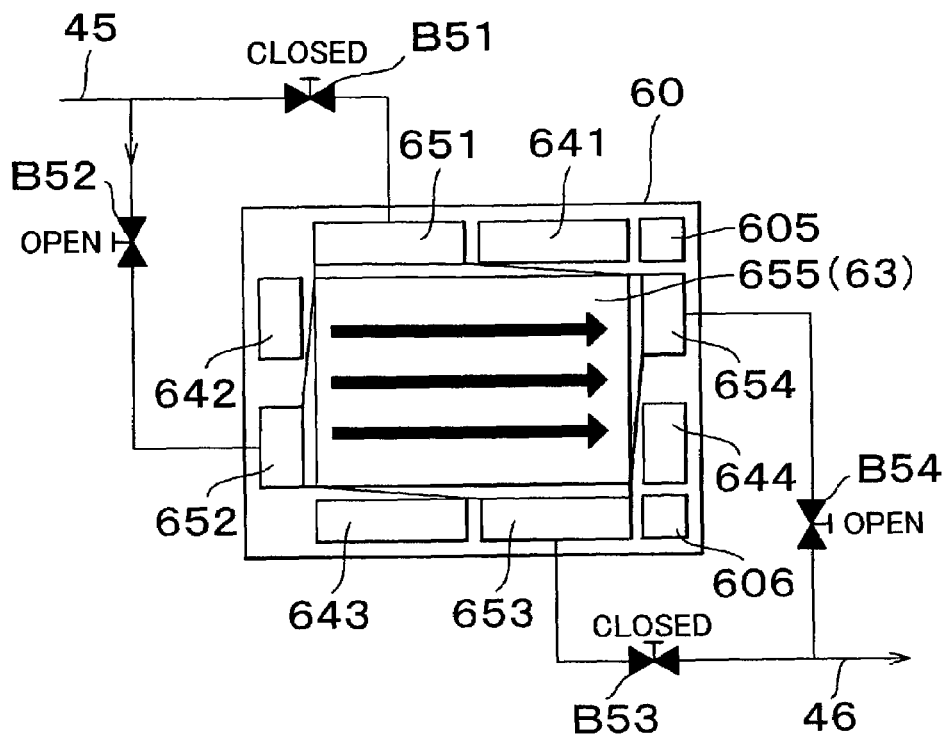
FIG. 14A and 14B are explanatory views of the flow direction of coolant in accordance with a third embodiment of the invention.
Figure 14B:
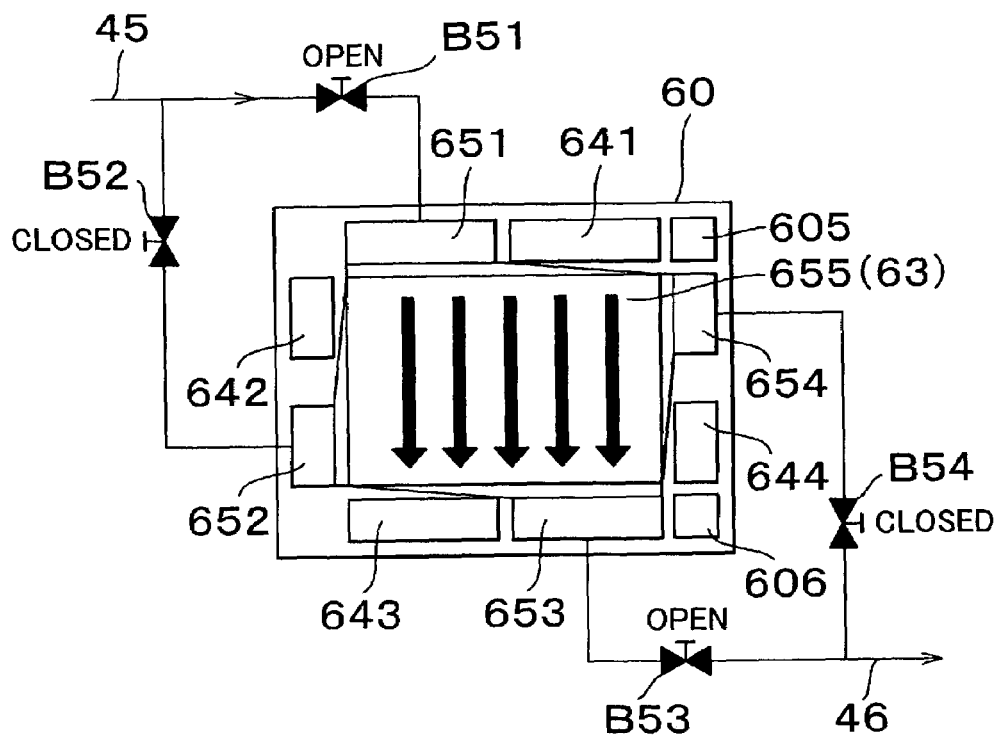

The third embodiment is realized by adopting another exemplary coolant passage in the second embodiment. FIGS. 14A, 14B are plan views of the cooling separator 60 which is viewed from the side of the coolant passage. FIG. 14A shows a first flow direction of coolant. FIG. 14B shows a second flow direction of coolant. As shown in FIGS. 14A, 14B, the square holes 607, 608 through which coolant flows are not formed in the cooling separator 60. Instead, each of long holes 651 to 654 for supplying and discharging coolant is formed through the coolant separator 60 along a corresponding one of four sides thereof. Similarly, each of long holes 641 to 644 is formed through the cooling separator 60 along a corresponding one of four sides thereof. These long holes communicate with the long holes 741 to 744 (already mentioned) of the central separator 70 in the direction of lamination. A concave portion 655 having a generally oblong outer periphery is formed in one surface of the cooling separator 60 which does not face the anode of the single cell. The concave portion 655 communicates with the long holes 651 to 654. Coolant is supplied to the cell module 20 either by horizontally flowing from the long hole 652 through the concave portion 655, that is, through the coolant passage 63 and being discharged from the long hole 654 (see FIG. 14A) or by vertically flowing from the long hole 651 through the concave portion 655, that is, through the coolant passage 63 and being discharged from the long hole 653 (see FIG. 14B).

The coolant introduction pipe 45 diverges into two branch pipes that are connected to the long holes 651, 652 respectively. Electromagnetic valves B51, B52 are installed in the branch pipes respectively. On the other hand, branch pipes extending from the long holes 653, 654 are assembled into the coolant exhaust pipe 46 as a single pipe. Electromagnetic valves B53, B54 are installed in the branch pipes respectively.

Switching control, which is performed by the control device 50 in accordance with the present embodiment at intervals of a predetermined period so as to switch the flow direction of oxidative gas, is substantially the same as in the case of the second embodiment. This switching control is represented by the flowchart shown in FIG. 12. However, according to the present embodiment, the control is further performed such that the flow directions of oxidative gas and coolant coincide with each other. That is, when the flow direction of oxidative gas is set as the horizontal direction shown in FIG. 11A in step S310, the flow direction of coolant is also set as the horizontal direction shown in FIG. 14A. When the flow direction of oxidative gas is set as the vertical direction shown in FIG. 11B in step S320, the flow direction of coolant is also set as the vertical direction shown in FIG. 14B. When the flow direction of gas is changed in step S340 or step S360 as well, the flow direction of coolant is synchronously switched so as to coincide with the changed direction. It is to be noted in the present embodiment that the electromagnetic valves B51 to B54 can be regarded as a third switching device of the invention.

According to the present embodiment that has been described hitherto, the upstream side of oxidative gas is cooled by coolant that is at a low temperature, and the downstream side of oxidative gas is cooled by coolant that has absorbed heat and thus reached a slightly high temperature. Hence, the upstream side of oxidative gas undergoes a more substantial drop in temperature than the downstream side of oxidative gas. As a rule, the upstream side of gas tends to be dry and the downstream side of gas tends to be wet. In this case, however, since the dew point is lowered by reducing the temperature on the upstream side of gas, the upstream side of gas is unlikely to be dry. Also, since the dew point is raised by increasing the temperature on the downstream side of gas, the downstream side of gas is unlikely to be wet.

In the aforementioned embodiment, coolant horizontally flows in the case of a low output of the fuel cell and vertically flows in the case of a high output. However, it is also appropriate that heat transmissibility be enhanced by adopting vertical flow of coolant corresponding to the shorter length of the coolant passage in the case of a low output and thus reducing the pressure loss of coolant and by adopting horizontal flow of coolant corresponding to the longer length of the coolant passage in the case of a high output and thus increasing the flow rate of coolant.

It is indisputably obvious that the invention is not limited to the aforementioned embodiments at all and that the invention can be implemented in various modes as long as they belong to the technical scope of the invention.

What is claimed is:

1. A fuel cell comprising:
a single-cell internal gas passage in which reactive gas flows through a single cell of the fuel cell;
a switching device that switches a flow direction of gas in the single-cell internal gas passage from a first direction to a second direction decussating the first direction; and
a controller that switches the flow direction of gas in the single-cell internal gas passage from the first direction to the second direction in accordance with an operational state of the fuel cell by means of the switching device.

2. The fuel cell according to claim 1, wherein
a plurality of small protrusions are formed in the single-cell internal gas passage such that reactive gas flows through gaps among the small protrusions.

3. The fuel cell according to claim 1, wherein
the first direction and the second direction are substantially perpendicular to each other.

4. The fuel cell according to claim 1, wherein
the controller estimates whether flooding has occurred and switches the flow direction of gas in the single-cell internal gas passage by means of the switching device if flooding has occurred.

5. The fuel cell according to claim 4, wherein
the controller estimates whether flooding has occurred on the basis of an output voltage or an impedance of the fuel cell and switches the flow direction of gas in the single-cell internal gas passage by means of the switching device if it is estimated that flooding has occurred.

6. The fuel cell according to claim 1, wherein
the controller switches the flow direction of gas in the single-cell internal gas passage by means of the switching device if an operating temperature of the fuel cell is equal to or lower than a predetermined temperature.

7. The fuel cell according to claim 1, wherein
a length and a width of the single-cell internal gas passage differs from a length and a width of the single-cell internal gas passage in the second direction.

8. The fuel cell according to claim 7, wherein
the single-cell internal gas passage is longer and narrower in the first direction than in the second direction, and
the controller switches the flow direction of gas to the first direction by means of the switching device if an output of the fuel cell has became equal to or lower than a predetermined value and switches the flow direction of gas to the second direction by means of the switching device if the output of the fuel cell has become higher than the predetermined value.

9. The fuel cell according to claim 1, wherein
the controller controls the flow direction of gas in the single-cell internal gas passage by controlling the switching device in accordance with an operational state of the fuel cell so as to supply gas from both a first gas supply port extending in the first direction and a second gas supply port extending in the second direction and discharge gas from one of a first gas discharge port extending in the first direction and a second gas discharge port extending in the second direction.

10. The fuel cell according to claim 9, wherein
the gases that have been supplied to the single-cell internal gas passage from the first gas supply port and the second gas supply port are combined on a downstream side of the single-cell internal gas passage.

11. The fuel cell according to claim 9, wherein
the controller controls the switching device at the time of a low output of the fuel cell or during non-humidified operation of the fuel cell.

12. The fuel cell according to claim 1, wherein
the single-cell internal gas passage is a passage through which oxidative gas flows.

13. The fuel cell according to claim 1, wherein
the single-cell internal gas passage is a passage through which fuel gas flows.

14. The fuel cell according to claim 1, wherein
the single-cell internal gas passage has a first single-cell internal gas passage through which oxidative gas is supplied and a second single-cell internal gas passage which is disposed on the other side of the first single-cell internal gas passage across an anode, an electrolytic membrane, and a cathode and through which fuel gas is supplied,
the switching device has first switching device that switches a flow direction of gas in the first single-cell internal gas passage and second switching device that switches a flow direction of gas in the second single-cell internal gas passage, and
the controller switches the flow direction of gas in the first single-cell internal gas passage or the second single-cell internal gas passage by means of one of the first switching device and the second switching device in accordance with an operational state of the fuel cell.

15. The fuel cell according to claim 14, wherein
the controller controls the first switching device and the second switching device such that the oxidative gas flows through the first single-cell internal gas passage and the fuel gas flows through the second single-cell internal gas passage in opposite directions.

16. The fuel cell according to claim 1, further comprising:
a coolant passage through which coolant for cooling the single cell flows; and a second switching device that switches a flow direction of coolant in the coolant passage, wherein the controller switches the flow direction of coolant in the coolant passage from a third direction to a fourth direction intersecting with the third direction by means of the second switching device when the flow direction of gas from the first direction is switched to the second direction.

17. The fuel cell according to claim 16, wherein the controller switches the flow direction of coolant in the coolant passage to a direction coincident with the second direction of the flow direction of the gas when switching the flow direction of gas from the first direction to the second direction.

18. The fuel cell according to claim 17, wherein the single-cell internal gas passage is a passage through which oxidative gas flows.

19. The fuel cell according to claim 17, wherein the coolant passage is shorter and wider in the third direction than in the fourth direction, and the controller switches the flow direction of coolant to the third direction by means of the switching device if an output of the fuel cell has became equal to or lower than a predetermined value and switches the flow direction of coolant to the fourth direction by means of the switching device if an output of the fuel cell has become higher than the predetermined value.

20. A method of controlling a fuel cell capable of changing a flow direction of gas in a single-cell internal gas passage in which reactive gas flows through a single cell of the fuel cell, comprising determining an operational state of the fuel cell, and switching a flow direction of gas in the single-cell internal gas passage to a second direction decussating a first direction in accordance with the determined operational state of the fuel cell.

21. The fuel cell according to claim 1, further comprising:

a plurality of protrusions formed in the single-cell internal gas passage and arranged as a grid.

22. The fuel cell according to claim 1, wherein the single-cell internal gas passage is formed as a concave portion having a generally rectangular outer periphery, and the switching device switches the flow direction in the single-cell internal gas passage for a first flow path extending in the first direction across the concave portion from a first edge of the outer periphery to a second edge of the outer periphery to the second direction decussating the first direction, the second direction corresponding to a second flow path extending across the concave portion from a third edge of the outer periphery to a fourth edge of the outer periphery.

23. The method of claim 20, wherein the single-cell internal gas passage is formed as a concave portion having a generally rectangular outer periphery, and the switching device switches the flow direction in the single-cell internal gas passage for a first flow path extending in the first direction across the concave portion from a first edge of the outer periphery to a second edge of the outer periphery to the second direction decussating the first direction, the second direction corresponding to a second flow path extending across the concave portion from a third edge of the outer periphery to a fourth edge of the outer periphery.

* * * * *

UNITED STATES PATENT AND TRADEMARK OFFICE
CERTIFICATE OF CORRECTION

PATENT NO. : 7,195,831 B2 Page 1 of 1
APPLICATION NO. : 10/278944
DATED : March 27, 2007
INVENTOR(S) : Seiji Sano et al.

It is certified that error appears in the above-identified patent and that said Letters Patent is hereby corrected as shown below:

On front page, under Item [56] Foreign Patent Documents, please delete "JP 20000-30730", and please insert --JP 2000-30730--

In column 1, line 29, please delete "gas to flows" and please insert --gas flows--

In column 1, line 31, please delete "gas to flows" and please insert --gas flows--

In column 1, line 42, please delete "7-2353234" and please insert --7-235324--

In column 4, line 17, please delete "example, is formed so" and please insert --example, so--

In column 4, line 30, please delete "32" and please insert --30--

In column 10, line 61, please delete "11B) If" and please insert --11B). If--

Signed and Sealed this

Second Day of October, 2007

JON W. DUDAS
*Director of the United States Patent and Trademark Office*